(12) United States Patent
Downing et al.

(10) Patent No.: US 9,020,298 B2
(45) Date of Patent: Apr. 28, 2015

(54) AUTOMATED IMAGE CROPPING TO INCLUDE PARTICULAR SUBJECTS

(75) Inventors: Elliott O. Downing, Redmond, WA (US); Oscar M. P. Koenders, Sammamish, WA (US); Benjamin T. Grover, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1282 days.

(21) Appl. No.: 12/424,349

(22) Filed: Apr. 15, 2009

(65) Prior Publication Data

US 2010/0266208 A1  Oct. 21, 2010

(51) Int. Cl.
*G06K 9/20* (2006.01)
*H04N 1/387* (2006.01)

(52) U.S. Cl.
CPC .................................. *H04N 1/3872* (2013.01)

(58) Field of Classification Search
USPC .......................................... 382/282, 103, 298
See application file for complete search history.

(56) References Cited

U.S. PATENT DOCUMENTS

| | | | |
|---|---|---|---|
| 7,133,571 B2 | 11/2006 | Cheatle | |
| 7,346,212 B2 | 3/2008 | Cheatle | |
| 8,180,177 B1 * | 5/2012 | Intwala | 382/298 |
| 8,358,876 B1 * | 1/2013 | Gilra et al. | 382/298 |
| 2002/0114535 A1 * | 8/2002 | Luo | 382/282 |
| 2006/0257048 A1 | 11/2006 | Lin et al. | |
| 2007/0024909 A1 | 2/2007 | Hanechak | |
| 2007/0201765 A1 | 8/2007 | DuBois | |
| 2008/0019574 A1 * | 1/2008 | Scalise et al. | 382/118 |
| 2008/0082912 A1 | 4/2008 | Atkins | |
| 2010/0027876 A1 * | 2/2010 | Avidan et al. | 382/162 |
| 2010/0299627 A1 * | 11/2010 | Kenagy | 715/800 |
| 2010/0303384 A1 * | 12/2010 | Knee | 382/298 |

OTHER PUBLICATIONS

Andersson et al, Scalable Vector Graphics 1.1 Specification, W3C 2003.*
Wikipedia article "Aspect Ratio", extracted from the Web Archive as of 2005.*
"akonD", "ID Photo Processor: Batch photo processing software", retrieved at <<http://www.akond.net/?issue_id=196>>, Feb. 2, 2009, pp. 1-2.
Santella, et al., "GazeBased Interaction for SemiAutomatic Photo Cropping", Proceedings of the 2006 Conference on Human Factors in Computing Systems, retrieved at <<http://research.microsoft.com/en-us/um/people/cohen/gazebasedcropping_chi.pdf>>, Apr. 22-28, 2006, pp. 1-10.

(Continued)

*Primary Examiner* — Mark Roz
(74) *Attorney, Agent, or Firm* — John Jardine; Kate Drakos; Micky Minhas

(57) ABSTRACT

A digital image is automatically cropped to fit within a desired frame. The cropping is based on one or more of two identified portions of the image. One of the portions is an all-subjects portion that includes all the identified subjects of a particular type in the image. The other portion is an attention portion that identifies an intended focus of the image. An attempt to crop the image to include both of these portions is made, and if unsuccessful then an attempt to crop the image to include at least the all-subjects portion is made. If neither of these attempts is successful, then the image is cropped to include one or more, but less than all, of the identified subjects of the particular type in the image.

20 Claims, 6 Drawing Sheets

(56) References Cited

OTHER PUBLICATIONS

Wootbot, "Philips 10.2 LCD Photo Frame", retrieved at <<http://selloutwoot.com/Blog/ViewEntry.aspx?Id=7166>>, Jan. 19, 2009, pp. 1-3.

Puckett, Sean., "Matty—Framing/Watermarks", retrieved at <<http://nexi.com/matty>>, Feb. 2, 2009, pp. 1-11.

Viola, et al., "Robust Real-time Object Detection", Second International Workshop on Statistical and Computational Theories of Vision—Modeling, Learning, Computing, and Sampling, retrieved at <<http://research.microsoft.com/en-us/um/people/viola/pubs/detect/violajones_ijcv.pdf>>, Jul. 13, 2001, pp. 1-25.

Liu, et al., "Learning to Detect a Salient Object", IEEE Computer Society Conference on Computer Vision and Pattern Recognition, retrieved at <<http://ieeexplorejeee.org/xpl/freeabs_all.jsp?arnumber=4270072>>, Jun. 17-22, 2007, pp. 1-8.

Wang, et al., "A Unified Framework for Subspace Face Recognition" IEEE Transactions on Pattern Analysis and Machine Intelligence, retrieved at <<http://ieeexplorejeee.org/Xplore/login.jsp?url=httpc03A%2F%2Fieeexplore.ieee.org%2Fiel5%2F34%2F29188%2F01316855.pdf&authDecision=-203>>, vol. 26, No. 9, Sep. 2004, pp. 1222-1228.

\* cited by examiner

AUTOMATED IMAGE CROPPING TO INCLUDE PARTICULAR SUBJECTS

BACKGROUND

Digital photography has become commonplace, with digital images replacing traditional film in many situations. Digital images have many benefits, but are not without their problems. One such problem is that a digital image can sometimes have different dimensions than a frame into which the digital image is to be displayed, resulting in the digital image being cropped. A user can manually identify the part of the digital image that is to be cut off as part of the cropping, but this can be a burdensome and time-consuming task for the user, resulting in decreased user-friendliness and increased hassle for the user when working with digital images.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a determination is made as to whether an all-subjects portion of an image fits in a particular frame dimension. This all-subjects portion includes all subjects of a particular type identified in the image. If the all-subjects portion fits in the particular frame dimension, then the image is cropped to include at least the all-subjects portion in the image. However, if the all-subjects portion does not fit in the particular frame dimension, then an includable-subjects region that includes one or more subjects, but less than all the subjects, identified in the image is generated, and the image is cropped to include the includable-subjects region in the image.

In accordance with one or more aspects, an all-subjects portion of an image that includes subjects identified in the image is identified. An attention portion of the image that includes an area identified as an intended focus of the image is also identified. A determination is made as to whether the image can be cropped to fit in a particular frame dimension while including both the all-subjects portion and the attention portion. The image is cropped to include both the all-subjects portion and the attention portion if it is determined that the image can be cropped to fit in the particular frame dimension while including both the all-subjects portion and the attention portion. Otherwise, the image is cropped to include one or more of the subjects in the all-subjects portion.

BRIEF DESCRIPTION OF THE DRAWINGS

The same numbers are used throughout the drawings to reference like features.

DETAILED DESCRIPTION

Automated image cropping to include particular subjects is discussed herein. Generally, a digital image is automatically cropped to fit within a desired frame. Two portions of the digital image can be identified—one portion includes all the identified subjects of a particular type (e.g., faces) in the image, while the other portion identifies an attention area in the image. An attempt to crop the image to include both of these portions is first made, and if unsuccessful then an attempt to crop the image to include at least the portion that includes all the identified subjects in the image is made. If neither of these attempts is successful, then the image is cropped to include one or more (but less than all) of the identified subjects of the particular type in the image.

Additionally, in some situations a portion that identifies an attention area in the image is not generated. In such situations, the attempt to crop the image to include at least the portion that includes all the identified subjects in the image is still made, and if unsuccessful then the image is cropped to include one or more (but less than all) of the identified subjects of the particular type in the image.

Figure 1:
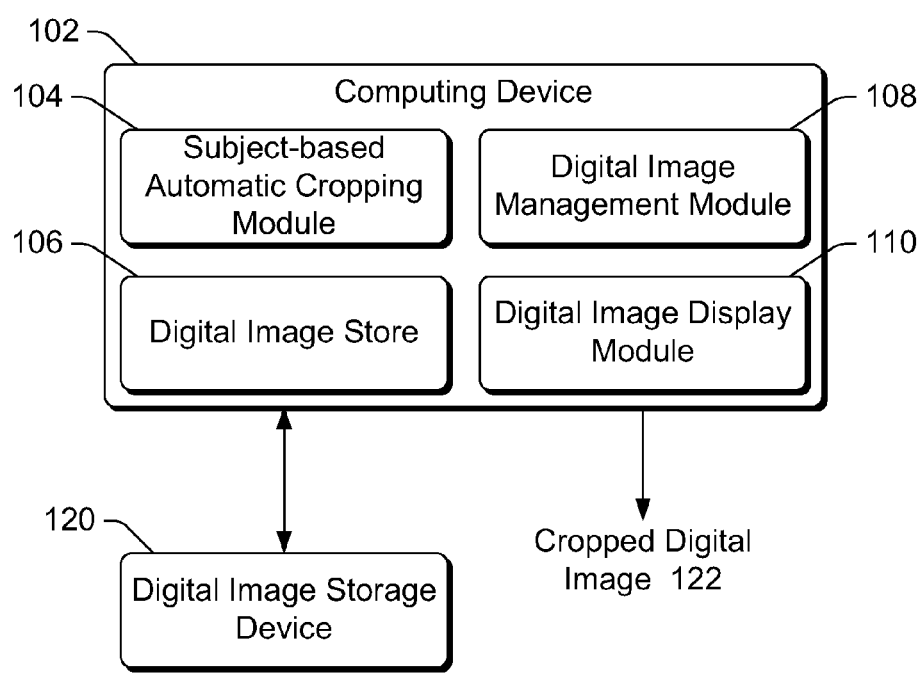
FIG. 1 illustrates an example system implementing the automated image cropping to include particular subjects in accordance with one or more embodiments.

FIG. 1 illustrates an example system 100 implementing the automated image cropping to include particular subjects in accordance with one or more embodiments. System 100 includes a computing device 102 that can be a variety of different devices capable of displaying and/or managing digital images. For example, computing device 102 can be a desktop computer, a mobile station, an entertainment appliance, a set-top box communicatively coupled to a display device, a television, a cell or other wireless phone, a handheld (or larger) game console, an automotive computer, a digital camera or other image capture device, and so forth. Digital images refer to images that can be stored and communicated digitally or electronically, rather than film or print images.

Computing device 102 includes a subject-based automatic cropping module 104, a digital image store 106, a digital image management module 108, and a digital image display module 110. Subject-based automatic cropping module 104 automatically crops digital images to include particular subjects. In one or more embodiments, the particular subjects are faces. Alternatively, module 104 can operate based on other subjects, such as people (e.g., entire bodies), animals, particular objects (e.g., cars, flowers, etc.), and so forth. The particular techniques used by module 104 to perform the cropping are discussed in more detail below.

Cropping of a digital image refers to cutting off or removing a portion of the digital image. A portion or region of the digital image can be cropped on, and the parts (e.g., pixels) of the digital image in that cropped on portion or region remain as the digital image, with any other parts of the digital image being cut from the digital image. The pixels that are cut from the digital image are no longer part of the digital image (or at least are no longer displayed as part of the digital image).

Digital image store 106 is one or more local storage components that are used to store digital images before and/or after cropping by module 104. Image store 106 can be included as part of, or alternatively can be coupled to, computing device 102. For example, image store 106 can be a fixed and/or removable optical disc, a fixed and/or removable magnetic disk, a fixed and/or removable solid state memory (e.g., flash memory, random access memory (RAM), etc.), and so forth.

Computing device 102 can also be coupled to a separate digital image storage device 120. Analogous to digital image store 106, digital image storage device 120 can store digital images before and/or after cropping by module 104, and can be implemented using a variety of different storage components such as fixed and/or removable optical disc, fixed and/or removable magnetic disk, fixed and/or removable solid state memory, and so forth. Computing device 102 can be coupled to image storage device 120 in a variety of different wired and/or wireless manners, such as via a network (e.g., the Internet, a local area network, a telephone network, etc.), via a wired coupling (e.g., an IEEE 1394 connection, a universal serial bus (USB) connection, etc.), via a wireless coupling (e.g., a wireless USB connection, a Bluetooth connection, an infrared (IR) connection, etc.), and so forth.

Digital image management module 108 manages the retrieval, storage, and outputting of digital images for computing device 102. Digital images can be retrieved or otherwise obtained from a variety of different sources, such as image storage device 120, another device or component (not shown in FIG. 1), an image capture component or module of device 102 (e.g., a charge-coupled device (CCD), a complementary metal-oxide-semiconductor (CMOS) integrated circuit, etc.), and so forth. Module 108 can store digital images in, for example, image store 106 and/or image storage device 120. Image management module 108 can also output digital images to another device, such as for storage, for display, for printing of the image, and so forth.

Digital image display module 110 outputs cropped digital image 122 for display. In one or more embodiments, computing device 102 displays cropped digital image 122. In other embodiments, computing device 102 generates one or more signals based on the cropped digital image and outputs these generated signals to one or more other devices (e.g., televisions, monitors, projectors, etc.) which in turn display the cropped digital image.

Figure 2:
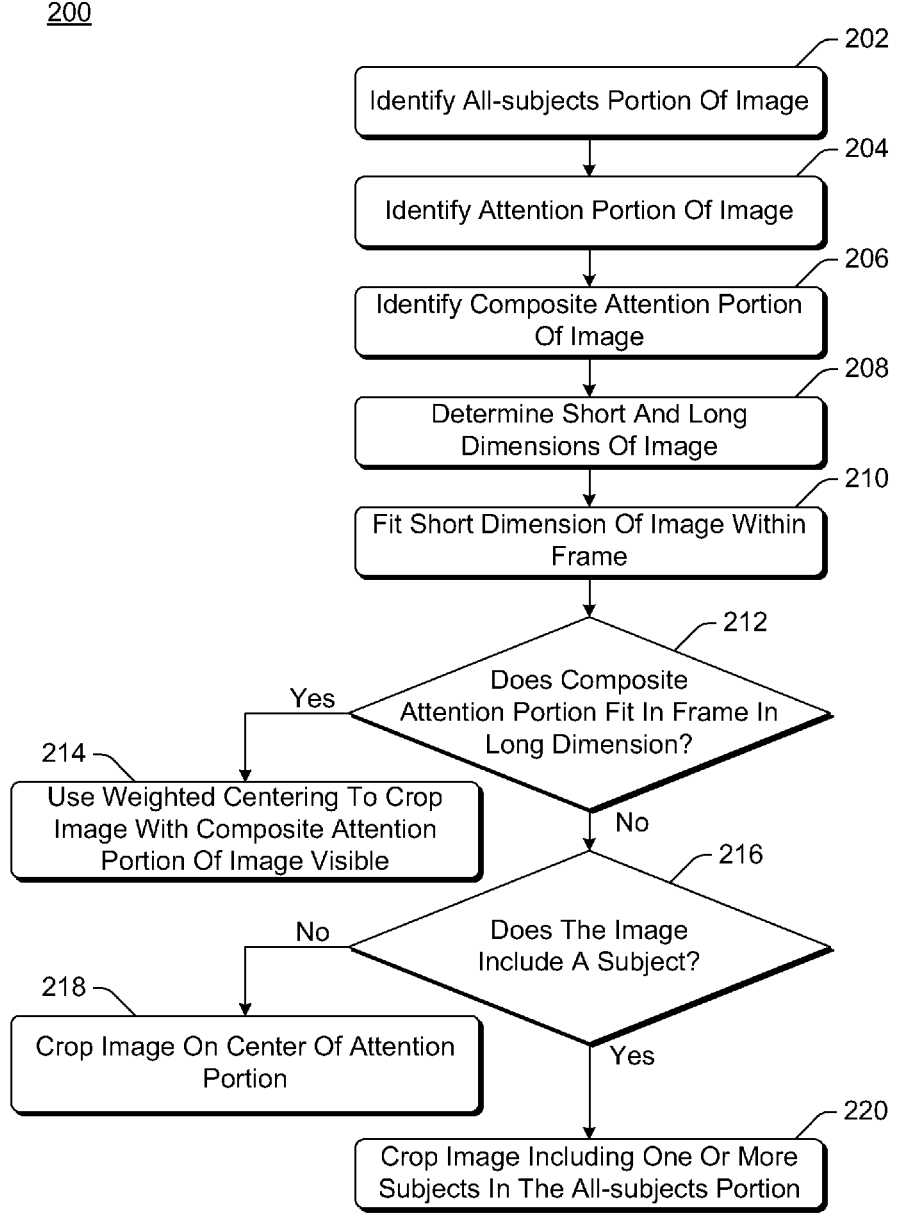
FIG. 2 is a flowchart illustrating an example process for automated image cropping to include particular subjects in accordance with one or more embodiments.

FIG. 2 is a flowchart illustrating an example process 200 for automated image cropping to include particular subjects in accordance with one or more embodiments. Process 200 is carried out by a device, such as computing device 102 of FIG. 1, and can be implemented in software, firmware, hardware, or combinations thereof. Process 200 is an example process for automated image cropping to include particular subjects; additional discussions of automated image cropping to include particular subjects are included herein with reference to different figures. Process 200 is also discussed with reference to FIGS. 3 and 4 that illustrate example digital images that can be automatically cropped using process 200. In the example images of FIGS. 3 and 4, it is assumed that the subjects are faces.

Process 200 is performed for each digital image that is to be automatically cropped. In process 200, an all-subjects portion of a digital image is identified (act 202). The all-subjects portion of the digital image is the portion of the digital image that includes all the subjects of a particular type that have been identified in the digital image. For example, if the subject is a face, then the all-subjects portion of the digital image is the portion of the digital image that includes all the faces identified in the digital image. In one or more embodiments the all-subjects portion of the digital image is a smallest portion of a particular shape that includes all of the identified subjects, although the all-subjects portion can alternatively be a larger portion. The all-subjects portion of the digital image is oftentimes a rectangular shape, although the portion can alternatively be other shapes.

The particular subjects in an image can be identified in a variety of different manners, and it is to be appreciated that different techniques can be used for different types of subjects. For example, various conventional pattern matching or classification techniques, neural network-based classification techniques, and so forth can be used to identify particular subjects in an image. In one or more embodiments, a unified subspace analysis technique using PCA (Principal Components Analysis), LDA (Linear Discriminant Analysis), and Bayesian algorithms is used to identify faces in an image, such as the technique discussed in "A Unified Framework for Subspace Face Recognition" by Xiaogang Wang and Xiaoou Tang, IEEE Transactions on Pattern Analysis and Machine Intelligence, pages 1222-1228 (September 2004). It is to be appreciated, however, that other techniques can alternatively be used to identify faces in an image.

It should be noted that situations can arise where no subjects are identified in a digital image. In such situations, no all-subjects portion of the image is identified in act 202.

Figure 3:
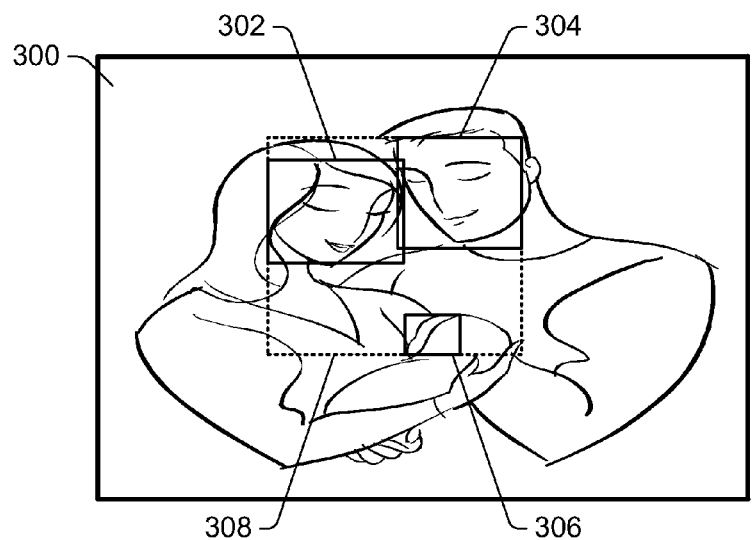
FIGS. 3 and 4 illustrate example images that can be automatically cropped in accordance with one or more embodiments.

FIG. 3 illustrates an example image 300 that can be automatically cropped in accordance with one or more embodiments. In the example image 300, it is assumed that three faces are identified, shown by solid-line rectangles 302, 304, and 306. An all-subjects portion is also identified and is shown by dashed-line rectangle 308.

Returning to FIG. 2, an attention portion of the digital image is also identified (act 204). The attention portion of the digital image is a portion of the image that is identified as being an intended focus of the image. The intended focus of the image can be identified in various conventional manners, such as being based on color analysis of the digital image, being based on contrast analysis of the digital image, being based on other rules and criteria, and so forth. In one or more embodiments, a salient object detection technique using CRF (Condition Random Field) learning is used to identify the attention portion of the image, such as the technique discussed in "Learning to Detect A Salient Object" by Tie Liu, et al., IEEE Computer Society Conference on Computer Vision and Pattern Recognition (CVPR), 2007. It is to be appreciated, however, that other techniques can alternatively be used to identify the attention portion of the image. The attention portion of the digital image is oftentimes a rectangular shape, although the portion can alternatively be other shapes.

A composite attention portion of the image is also identified (act 206). The composite attention portion includes both the all-subjects portion identified in act 202 and the attention portion identified in act 204. In one or more embodiments the composite attention portion of the digital image is a smallest portion of a particular shape that includes both the all-subjects portion and the attention portion, although the composite attention portion can alternatively be a larger portion. The composite attention portion of the digital image is oftentimes a rectangular shape, although the portion can alternatively be other shapes.

Figure 4:
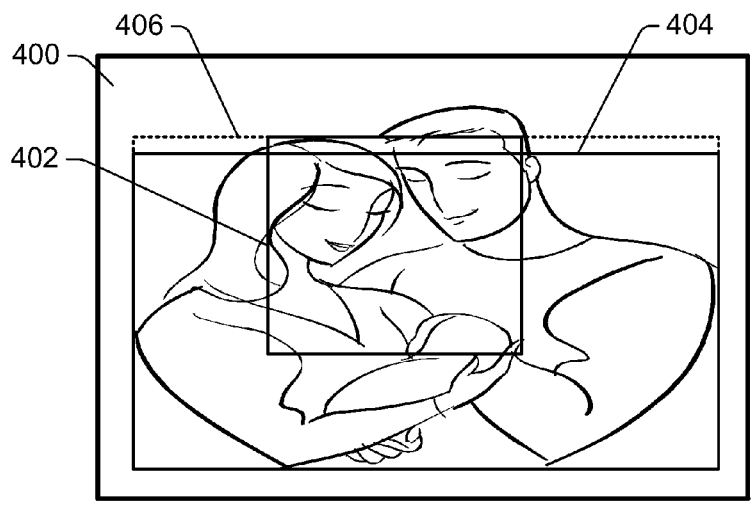

FIG. 4 illustrates an example image 400 that can be automatically cropped in accordance with one or more embodiments. In the example image 400, an example all-subjects portion is identified and is shown by solid-line rectangle 402. An example attention portion is also identified and is shown by solid-line rectangle 404. A composite attention portion is also identified and is shown by dashed-line rectangle 406. It is to be appreciated that solid line-rectangle 404 and dashed-line rectangle 406 overlap each other in many areas.

Returning to FIG. 2, a short dimension and a long dimension of the image are determined (act 208). A digital image has a resolution that is typically expressed in terms of pixels (or other units) in each dimension. Frames also typically have a size that is expressed in terms of pixels (or other units) in each dimension. The two dimensions are also typically referred to as being width and height, or horizontal and vertical dimensions. Given the dimensions of a digital image or frame, an aspect ratio of the digital image or frame can be calculated as the width divided by the height.

In one or more embodiments, if the digital image has a larger aspect ratio than the frame, then the width of the digital image is deemed to be the long dimension and the height of the digital image is deemed to be the short dimension. However, if the digital image has a smaller aspect ratio than the frame, then the height of the digital image is deemed to be the long dimension and the width of the digital image is deemed to be the short dimension.

Alternatively, the short and long dimensions of the image can be determined in different manners. For example, the one of the two dimensions of the image having the smaller pixel count can be determined to be the short dimension, and the one of the two dimensions having the larger pixel count can be determined to be the long dimension. By way of another example, the short and long dimensions can be determined using different rules or criteria, can be determined randomly, and so forth.

The short dimension of the digital image is then fit within the corresponding dimension of a frame (act 210). The frame has associated dimensions which represent the desired resolution of the digital image. The frame can refer to an area in which the digital image is to be displayed, or alternatively any other desired resolution. In one or more embodiments the frame is a digital display, such as a display device or a window (or other region) displayed on the display device. Alternatively, the frame can take other forms, such as any region having a size desired by a user of the device implementing process 200, a physical frame into which a printed copy of the digital image is to be placed, and so forth.

The frame has two dimensions (typically referred to as horizontal and vertical) as discussed above. If the short dimension of the digital image is the vertical dimension of the image, then the corresponding dimension of the frame is the vertical dimension. Similarly, if the short dimension of the digital image is the horizontal dimension of the image, then the corresponding dimension of the frame is the horizontal dimension.

Fitting the short dimension of the digital image within the corresponding dimension of the frame refers to scaling the image as appropriate so that the resolution of the short dimension of the digital image is the same as the size of the corresponding dimension of the frame. For example, if the digital image has a resolution of 3264×2448 pixels, and the frame has a size of 1400×1224 pixels, then the digital image is scaled by 0.5. By way of another example, if the digital image has a resolution of 3264×2448 pixels, and the frame has a size of 4896×4896, then the digital image is scaled by 2.0.

Any of a variety of conventional scaling algorithms can be used to scale the image to obtain a lower resolution version of the digital image or a higher resolution version of the digital image as appropriate. Examples of different scaling or image resizing algorithms or processes that can be used to obtain a lower resolution version of the digital image include Mitchell filters, box filters, bicubic filters, seam carving, and so forth. Examples of different scaling or image resizing algorithms or processes that can be used to obtain a higher resolution version of the digital image include bilinear interpolation, nearest-neighbor interpolation, bicubic interpolation, and so forth.

An attempt is then made to crop the image to include the composite attention portion by checking whether the composite attention portion identified in act 206 fits within the frame along the long dimension (act 212). The long dimension of the image is scaled as part of fitting the short dimension of the image within the frame in act 210 discussed above. Similarly, the all-subjects portion, attention portion, and composite attention portions are also scaled as part of fitting the short dimension of the image within the frame in act 210 discussed above.

The composite attention portion fits within the frame along the long dimension if the composite attention portion (as scaled) is visible in the frame. If the composite attention portion has a resolution along the long dimension that is less than or equal to the resolution of the frame along the long dimension, then the composite attention portion is visible in the frame. If at least a part of the composite attention portion is not visible in the frame, then the composite attention portion does not fit within the frame along the long dimension.

If the composite attention portion fits within the frame along the long dimension, then weighted centering is used to crop the image with the composite attention portion of the image being visible (act 214). Essentially, a crop area of the digital image is identified that includes the composite attention portion. This crop area can be repositioned along the short and/or long dimensions of the frame so that it includes the composite attention portion.

In act 214, the location of the crop area is determined using a weighted centering technique. The weighted centering technique shifts the position of the crop area by an amount offset from the center of the image, the amount being proportional to an amount that the composite attention portion is offset from the center of the image. For example, if the center of the composite attention portion is offset one-third of the distance between the center of the digital image and the edge of the digital image in the long dimension, then the crop area is also shifted one-third from the center of the image in the long dimension. By way of another example, if the center of the composite attention portion and the center of the digital image are the same in the short dimension, then the crop area is not shifted from the center of the image in the short dimension.

Alternatively, rather than using weighted centering to crop the image in act 214, a variety of different techniques can be used to determine the location of the crop area. For example, the crop area can be positioned as close to the center of the digital image as possible, as close to the center of the composite attention portion as possible, as close to a particular edge or corner of the digital image as possible, randomly, and so forth.

Returning to act 212, if the composite attention portion does not fit within the frame along the long dimension, then a check is made as to whether the image includes at least one subject (act 216). If there are no subjects in the digital image, then the image is cropped on the center of the attention portion (act 218). This cropping in act 218 is centering the attention portion in the frame, such as by shifting the image so that the center of the attention area aligns with the center of the digital image. Alternatively, rather than cropping the image on the center of the attention portion, the crop area for the cropping in act 218 can be determined in different manners, such as cropping the image on the center of the digital image, cropping the image as close to a particular edge or corner of the digital image as possible, randomly, and so forth.

Returning to act 216, if the image does include at least one subject, then the image is cropped to include one or more of the subjects in the all-subjects portion (act 220). It is to be appreciated that, in act 220, not all of the subjects in the all-subjects portion may be included in the cropped image. Which one or more subjects in the all-subjects portion the image is cropped to include can be identified in a variety of different manners. In one or more embodiments, the one or more subjects are identified as discussed below with reference to process 500 of FIG. 5. Alternatively, the one or more subjects can be identified in different manners, such as analyzing each possible combination of subjects to determine which cropping includes the most subjects, identifying particular subjects that have been assigned a higher priority or ranking by the user or some other technique and including those particular subjects in the cropping, identifying one or more subjects randomly, and so forth.

In the example process 200 illustrated, both an all-subjects portion and an attention portion are identified, and the composite attention portion includes both the all-subjects portion and the attention portion. Alternatively, the attention portion may not be identified and used in process 200. In such situations, the composite attention portion is the all-subjects portion.

Figure 5:
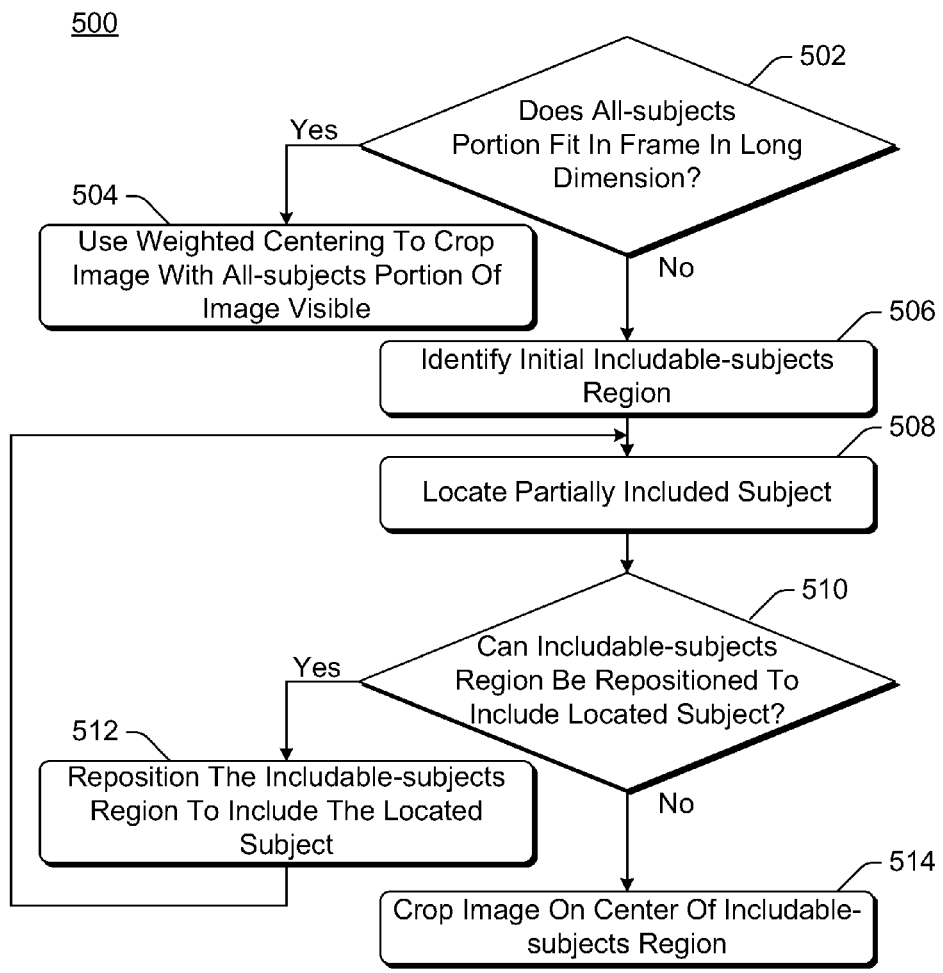
FIG. 5 is a flowchart illustrating another example process for automated image cropping to include particular subjects in accordance with one or more embodiments.

FIG. 5 is a flowchart illustrating an example process 500 for automated image cropping to include particular subjects in accordance with one or more embodiments. Process 500 is carried out by a device, such as computing device 102 of FIG. 1, and can be implemented in software, firmware, hardware, or combinations thereof. In one or more embodiments, process 500 performs act 220 of FIG. 2. Process 500 is an example process for automated image cropping to include particular subjects; additional discussions of automated image cropping to include particular subjects are included herein with reference to different figures.

Process 500 is also discussed with reference to FIGS. 6 and 7 that illustrate example digital images that can be automatically cropped using process 500. In the example images of FIGS. 6 and 7, it is assumed that the subjects are faces.

In process 500, an attempt is made to crop the image to include the all-subjects portion by checking whether the all-subjects portion fits in the frame in the long dimension (act 502). This check is analogous to the check of whether the composite attention portion fits in the frame in the long dimension in act 212 of FIG. 2, except that the checking in act 502 is for the all-subjects portion rather than the composite attention portion in act 212.

If the all-subjects portion does not fit in the frame in the long dimension, then weighted centering is used to crop the image with the all-subjects portion of the image being visible (act 504). This cropping is analogous to the cropping of the image in act 214 of FIG. 2, except that the cropping is done with the all-subjects portion of the image being visible in act 504 rather than the composite attention portion of the image being visible in act 214. Additionally, different techniques other than weighted centering can be used to crop the image as discussed above in act 214.

Returning to act 502, if the all-subjects portion does not fit within the frame along the long dimension, then an initial includable-subjects region is identified (act 506). The includable-subjects region is a region or portion of the image that includes one or more subjects. The includable-subjects region typically does not include all of the subjects (if all of the subjects could be included in the includable-subjects region, then the all-subjects portion would have fit in the frame in the long dimension in act 502, and process 500 would not have progressed to act 506).

The initial includable-subjects region is a region having dimensions that are the same as the dimensions of the frame. The position of this region in the image can be determined in a variety of different manners. In one or more embodiments, the initial includable-subjects region is positioned so that the center of the region is the same location as the center of the all-subjects portion. Alternatively, the initial includable-subjects region can be positioned in other manners, such as positioning the region so that the center of the region is the same location as the center of the image, positioning the region in one of the corners of the image, positioning the region so that a particular subject in the image is included in (e.g., at the center of) the region, and so forth.

A partially included subject is then located (act 508). A partially included subject refers to a subject that is partially, but not completely, included in the includable-subjects region. The locations of each of the subjects is based on the subjects identified in the image as discussed above with reference to act 202 of FIG. 2. Whether a particular subject is partially included in the includable-subjects region can be readily identified by comparing the location of the subject to the location of the includable-subjects region. Alternatively, in act 508 a subject that is in the image but no part of the subject is included in the initial includable-subjects region can be located in act 508.

If multiple subjects are partially included in the includable-subjects region, then one of those multiple subjects is selected as the located subject in act 508. A variety of different criteria and/or rules can be used to select one of the multiple subjects. In one or more embodiments, an amount that each subject is included in the includable-subjects region is determined and the subject that is most included (having the largest determined amount included in the region) is selected as the located subject in act 508. The amount can be, for example, a percentage of the subject (e.g., a percentage of the rectangle identifying the subject) that is included in the region. Alternatively, other criteria and/or rules can be used, such as selecting a subject having a higher priority (e.g., due to the subject having a particular size, due to the subject having been tagged with a label by the user, etc.), selecting a subject based on its location (e.g., how close the subject is to other subjects already included in the region, how close the subject is to a center of the region, etc.), random selection, and so forth.

A check is then made as to whether the includable-subjects region can be repositioned to include the located subject (act 510). The includable-subjects region can be repositioned to include the subject located in act 508 if the includable-subjects region can be repositioned so that the located subject is located in the includable-subjects region and any subjects already in the includable-subjects region remain in the includable-subjects region.

Figure 6:
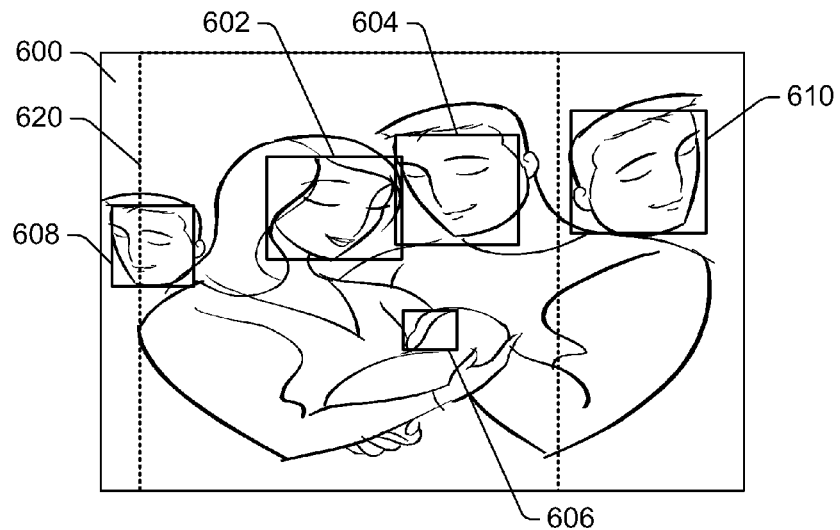
FIGS. 6 and 7 illustrate example images that can be automatically cropped in accordance with one or more embodiments.

FIG. 6 illustrates an example image 600 that can be automatically cropped in accordance with one or more embodiments. In the example image 600, five example faces are detected and shown by solid-line rectangles 602, 604, 606, 608, and 610. An initial includable-subjects region is shown by dashed-line rectangle 620. As can be seen in the example of FIG. 6, the includable-subjects region (rectangle 620) includes some faces (the faces in rectangles 602, 604, and 606), but not other faces (the faces in rectangles 608 and 610). One of these other faces (the face in rectangle 608), however, is partially included.

Figure 7:
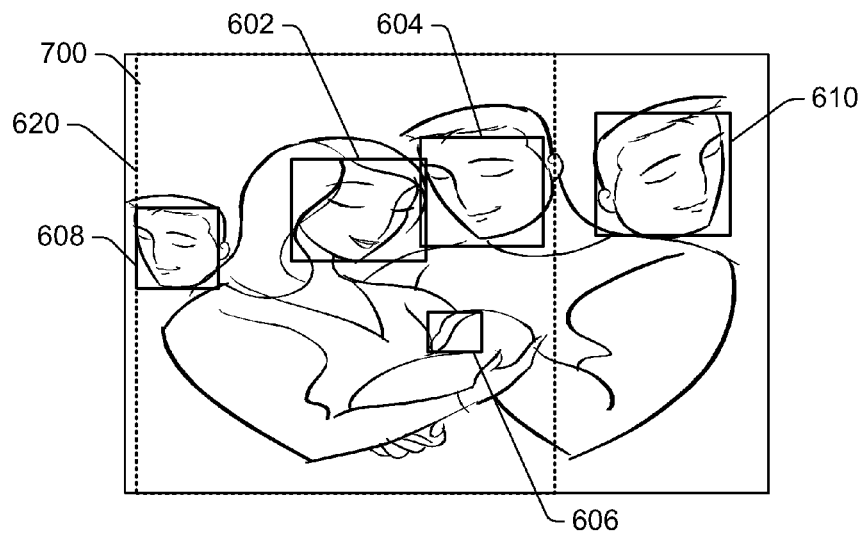

FIG. 7 illustrates an example image 700 that can be automatically cropped in accordance with one or more embodiments. Image 700 is similar to image 600 of FIG. 6, except that the initial includable-subjects region shown by dashed-line rectangle 620 has been repositioned to include the face in rectangle 608.

Returning to FIG. 5, if the includable-subject area can be repositioned to include the located subject, then the includable-subject area is repositioned to include the located subject (act 512). Process 500 then returns to act 508 to locate another partially included subject.

Returning to act 510, if the includable-subject area cannot be repositioned to include the located subject, then the image is cropped to include the includable-subjects region (act 514) as initially located in act 506 or as previously repositioned in act 512. Alternatively, process 500 can return to act 508 one or more times to select a different one of multiple subjects that are partially included in the includable-subjects region to check in act 510 whether the includable-subjects region can be repositioned to include one or more of these multiple subjects.

With respect to processes 200 and 500 shown in FIGS. 2 and 5, respectively, it is to be appreciated that these processes are examples and that various changes can be made to these processes in implementing the automated image cropping to include particular subjects techniques discussed herein. For example, various acts in processes 200 and 500 can be combined, separated into multiple acts, performed in different orders, and so forth. By way of example, in process 200 of FIG. 2, act 202 can be performed before, after, or concurrently with act 204.

Additionally, the discussions of automated image cropping to include particular subjects herein refers primarily to various areas (e.g., portions, regions, and frames) having a rectangular shape. It is to be appreciated, however, that the automated image cropping to include particular subjects can alternatively use portions, regions, and/or frames of other shapes. For example, portions, regions, and/or frames can be circles, triangles, octagons, stars, and so forth. When using such different shapes, one of the dimensions is determined to be the short dimension and is fit into the frame (e.g., in acts 208 and 210 of FIG. 2). Which dimension is the short dimension can be determined in a variety of different manners, based at least in part on the shape of the area. The other portions or regions can then be adjusted or repositioned as appropriate based on the other dimensions of the frame.

Figure 8:
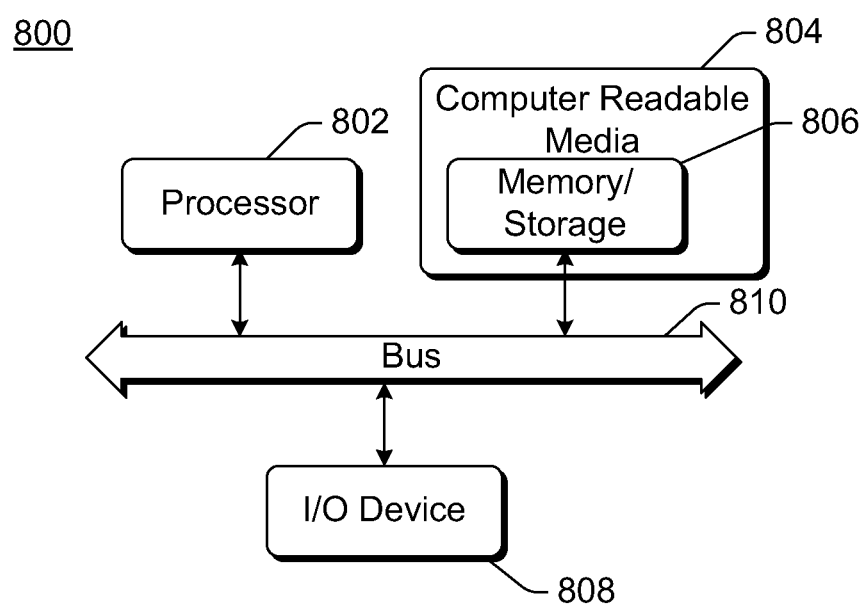
FIG. 8 illustrates an example computing device that can be configured to implement the automated image cropping to include particular subjects in accordance with one or more embodiments.

FIG. 8 illustrates an example computing device 800 that can be configured to implement the automated image cropping to include particular subjects in accordance with one or more embodiments. Computing device 800 can be, for example, computing device 102 of FIG. 1.

Computing device 800 includes one or more processors or processing units 802, one or more computer readable media 804 which can include one or more memory and/or storage components 806, one or more input/output (I/O) devices 808, and a bus 810 that allows the various components and devices to communicate with one another. Computer readable media 804 and/or one or more I/O devices 808 can be included as part of, or alternatively may be coupled to, computing device 800. Bus 810 represents one or more of several types of bus structures, including a memory bus or memory controller, a peripheral bus, an accelerated graphics port, a processor or local bus, and so forth using a variety of different bus architectures. Bus 810 can include wired and/or wireless buses.

Memory/storage component 806 represents one or more computer storage media. Component 806 can include volatile media (such as random access memory (RAM)) and/or non-volatile media (such as read only memory (ROM), Flash memory, optical disks, magnetic disks, and so forth). Component 806 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 802. It is to be appreciated that different instructions can be stored in different components of computing device 800, such as in a processing unit 802, in various cache memories of a processing unit 802, in other cache memories of device 800 (not shown), on other computer readable media, and so forth. Additionally, it is to be appreciated that the location where instructions are stored in computing device 800 can change over time.

One or more input/output devices 808 allow a user to enter commands and information to computing device 800, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 8. The features of the automated image cropping to include particular subjects techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
   identifying an all-subjects portion of an image that includes subjects identified in the image;
   identifying an attention portion of the image that includes an area identified as an intended focus of the image;
   determining a first dimension of the image and a second dimension of the image, the determining comprising:
      dividing a width of the image by a height of the image to determine an image aspect ratio;
      dividing a width of a frame by a height of the frame to determine a frame aspect ratio;
      comparing the image aspect ratio to the frame aspect ratio;
      determining the width of the image to be the second dimension and the height of the image to be the first dimension if the image aspect ratio is larger than the frame aspect ratio; and
      determining the height of the image to be the second dimension and the width of the image to be the first dimension if the image aspect ratio is smaller than the frame aspect ratio;
   scaling the image to fit the first dimension of the image within the frame;
   determining whether the scaled image can be cropped along the second dimension to fit in a corresponding frame dimension of the frame while including both the all-subjects portion and the attention portion; and
   cropping the scaled image along the second dimension to include both the all-subjects portion and the attention portion if it is determined that the scaled image can be cropped along the second dimension to fit in the corresponding frame dimension of the frame while including both the all-subjects portion and the attention portion, otherwise cropping the scaled image along the second dimension to include one or more of the subjects in the all-subjects portion by:
      identifying an initial includable-subjects region that includes one or more of the subjects identified in the image;
      locating an additional one of the subjects identified in the image that is not included in the initial includable-subjects region;
      checking whether the initial includable-subjects region can be repositioned to include the additional one subject; and
      if the initial includable-subjects region can be repositioned to include the additional one subject, then repositioning the initial includable-subjects region to include the additional one subject and cropping the image to include the repositioned initial includable-subjects region.

2. A method as recited in claim 1, wherein the all-subjects portion includes all subjects of a particular type that have been identified in the image.

3. A method as recited in claim 2, wherein the subjects of a particular type comprise faces.

4. A method as recited in claim 1, the cropping the image to include both the all-subjects portion and the attention portion comprising using a weighted centering process to crop the image while keeping both the all-subjects portion and the attention portion visible.

5. A method as recited in claim 1, the cropping the image to include one or more of the subjects in the all-subjects portion comprising cropping the image to include at least one, but fewer than all, of the subjects in the all-subjects portion.

6. A method as recited in claim 1, wherein the locating the additional one of the subjects comprises locating a subject that is partially included in the includable-subjects region.

7. A method as recited in claim 1, further comprising cropping the image to include the initial includable-subjects region if the initial includable-subjects region cannot be repositioned to include the additional subject.

8. A method as recited in claim 1, further comprising repeating, for each of one or more subjects identified in the image that is not included in the repositioned initial includable-subjects region:
   locating one of the one or more subjects identified in the image that is not included in the repositioned initial includable-subjects region;
   checking whether the repositioned initial includable-subjects region can be further repositioned to include the one subject; and
   if the repositioned initial includable-subjects region can be further repositioned to include the one subject, then further reposition the repositioned initial includable-subjects region to include the one subject and cropping the image to include the further repositioned initial includable-subjects region.

9. A method as recited in claim 1, wherein the locating the additional one of the subjects comprising locating one of multiple subjects of the subjects identified in the image that is most included in the initial includable-subjects region.

10. One or more computer storage memory devices having stored thereon multiple instructions that, when executed by one or more processors of a computing device, cause the one or more processors to:
   identify an all-subjects portion of an image that includes subjects identified in the image;
   identify an attention portion of the image that includes an area identified as an intended focus of the image;
   determine a first dimension of the image and a second dimension of the image by:
      dividing a width of the image by a height of the image to determine an image aspect ratio;
      dividing a width of a frame by a height of the frame to determine a frame aspect ratio;
      comparing the image aspect ratio to the frame aspect ratio;
      determining the width of the image to be the second dimension and the height of the image to be the first dimension if the image aspect ratio is larger than the frame aspect ratio; and
      determining the height of the image to be the second dimension and the width of the image to be the first dimension if the image aspect ratio is smaller than the frame aspect ratio;
   scale the image to fit the first dimension of the image within the frame;

determine whether the scaled image can be cropped along the second dimension to fit in a corresponding frame dimension of the frame while including both the all-subjects portion and the attention portion;

if it is determined that the scaled image can be cropped along the second dimension to fit in the corresponding frame dimension of the frame while including both the all-subjects portion and the attention portion, then crop the scaled image along the second dimension to include both the all-subjects portion and the attention portion, otherwise crop the scaled image along the second dimension to include one or more of the subjects in the all-subjects portion by:

identifying an initial includable-subjects region that includes one or more of the subjects identified in the image;

locating an additional one of the subjects identified in the image that is not included in the initial includable-subjects region;

checking whether the initial includable-subjects region can be repositioned to include the additional one subject; and if the initial includable-subjects region can be repositioned to include the additional one subject, then repositioning the initial includable-subjects region to include the additional one subject and cropping the image to include the repositioned initial includable-subjects region.

11. A method as recited in claim 1, wherein scaling the image to fit the first dimension of the image within the frame further comprises:

scaling the image so that the height of the image is the same as the height of the frame when it is determined that the height of the image is the first dimension; and scaling the image so that the width of the image is the same as the width of the frame when it is determined that the width of the image is the first dimension.

12. One or more computer storage memories as recited in claim 10, wherein the multiple instructions, when executed by the one or more processors of the computing device, cause the one or more processors to scale the image to fit the first dimension of the image within the frame by:

scaling the image so that the height of the image is the same as the height of the frame when it is determined that the height of the image is the first dimension; and scaling the image so that the width of the image is the same as the width of the frame when it is determined that the width of the image is the first dimension.

13. A computing device comprising:

one or more processors; and one or more computer storage media having stored thereon multiple instructions that, responsive to execution by the one or more processors, cause the one or more processors to perform operations comprising:

identifying an all-subjects portion of an image that includes subjects identified in the image;

identifying an attention portion of the image that includes an area identified as an intended focus of the image;

determining a first dimension of the image and a second dimension of the image by:

dividing a width of the image by a height of the image to determine an image aspect ratio;

dividing a width of a frame by a height of the frame to determine a frame aspect ratio;

comparing the image aspect ratio to the frame aspect ratio;

determining the width of the image to be the second dimension and the height of the image to be the first dimension if the image aspect ratio is larger than the frame aspect ratio; and determining the height of the image to be the second dimension and the width of the image to be the first dimension if the image aspect ratio is smaller than the frame aspect ratio;

scaling the image to fit the first dimension of the image within the frame;

determining whether the scaled image can be cropped along the second dimension to fit in a corresponding frame dimension of the frame while including both the all-subjects portion and the attention portion; and cropping the scaled image along the second dimension to include both the all-subjects portion and the attention portion if it is determined that the scaled image can be cropped along the second dimension to fit in the corresponding frame dimension of the frame while including both the all-subjects portion and the attention portion, otherwise cropping the scaled image along the second dimension to include one or more of the subjects in the all-subjects portion by:

identifying an initial includable-subjects region that includes one or more of the subjects identified in the image;

locating an additional one of the subjects identified in the image that is not included in the initial includable-subjects region;

checking whether the initial includable-subjects region can be repositioned to include the additional one subject; and if the initial includable-subjects region can be repositioned to include the additional one subject, then repositioning the initial includable-subjects region to include the additional one subject and cropping the image to include the repositioned initial includable-subjects region.

14. A computing device as recited in claim 13, wherein the scaling the image to fit the first dimension of the image within the frame further comprises:

scaling the image so that the height of the image is the same as the height of the frame when it is determined that the height of the image is the first dimension; and scaling the image so that the width of the image is the same as the width of the frame when it is determined that the width of the image is the first dimension.

15. A computing device as recited in claim 13, wherein the locating the additional one of the subjects comprises locating a subject that is partially included in the includable-subjects region.

16. A computing device as recited in claim 13, wherein the operations further comprise cropping the image to include the initial includable-subjects region if the initial includable-subjects region cannot be repositioned to include the additional subject.

17. A computing device as recited in claim 13, further comprising repeating, for each of one or more subjects identified in the image that is not included in the repositioned initial includable-subjects region:

locating one of the one or more subjects identified in the image that is not included in the repositioned initial includable-subjects region;

checking whether the repositioned initial includable-subjects region can be further repositioned to include the one subject; and if the repositioned initial includable-subjects region can be further repositioned to include the one subject, then further reposition the repositioned initial includable-subjects region to include the one subject and cropping the image to include the further repositioned initial includable-subjects region.

18. A computing device as recited in claim 13, wherein the locating the additional one of the subjects comprises locating one of multiple subjects of the subjects identified in the image that is most included in the initial includable-subjects region.

19. One or more computer storage memories as recited in claim 10, wherein the locating the additional one of the subjects comprises locating a subject that is partially included in the includable-subjects region.

20. One or more computer storage memories as recited in claim 10, wherein the locating the additional one of the subjects comprises locating one of multiple subjects of the subjects identified in the image that is most included in the initial includable-subjects region.

* * * * *